United States Patent
Moon et al.

(10) Patent No.: US 8,922,600 B2
(45) Date of Patent: Dec. 30, 2014

(54) DISPLAY PANEL TEST APPARATUS AND METHOD THEREOF

(71) Applicant: Samsung Display Co., Ltd., Yongin (KR)

(72) Inventors: Chang-Yun Moon, Yongin (KR);
Hee-Seong Jeong, Yongin (KR);
Won-Ju Shin, Yongin (KR)

(73) Assignee: Samsung Display Co., Ltd.,
Giheung-Gu, Yongin, Gyeonggi-Do (KR)

( * ) Notice: Subject to any disclaimer, the term of this patent is extended or adjusted under 35 U.S.C. 154(b) by 217 days.

(21) Appl. No.: 13/676,607

(22) Filed: Nov. 14, 2012

(65) Prior Publication Data

US 2014/0009505 A1    Jan. 9, 2014

(30) Foreign Application Priority Data

Jul. 9, 2012    (KR) .................. 10-2012-0074640

(51) Int. Cl.
*G09G 5/10* (2006.01)
(52) U.S. Cl.
CPC ...................................... *G09G 5/10* (2013.01)
USPC .......................................................... 345/690
(58) Field of Classification Search
None
See application file for complete search history.

(56) References Cited

U.S. PATENT DOCUMENTS

| 7,110,104 | B2 | 9/2006 | Choi et al. |
| 7,860,296 | B2 | 12/2010 | Kwon et al. |
| 2003/0142314 | A1* | 7/2003 | Hubble et al. ................. 356/402 |
| 2005/0072908 | A1* | 4/2005 | Grunert et al. ................ 250/226 |
| 2008/0253445 | A1* | 10/2008 | Hekstra et al. ........... 375/240.01 |
| 2009/0179881 | A1 | 7/2009 | Hibi |
| 2010/0259555 | A1 | 10/2010 | Hibi et al. |
| 2012/0026315 | A1 | 2/2012 | Lee et al. |

FOREIGN PATENT DOCUMENTS

| JP | 2000-081368 | 3/2000 |
| JP | 2009-168466 | 7/2009 |
| JP | 2010-249548 | 11/2010 |
| JP | 2010-281049 | 12/2010 |
| KR | 10-2009-0020790 | 2/2009 |

* cited by examiner

*Primary Examiner* — Adam R Giesy
*Assistant Examiner* — Henok Heyi
(74) *Attorney, Agent, or Firm* — Robert E. Bushnell, Esq.

(57) ABSTRACT

A display panel test apparatus that may include: a first measurer measuring first R, G, and B components of light emitted from a display panel at a first viewing angle; a second measurer measuring second R, G, and B components of light emitted from the display panel at a second viewing angle; a color coordinate calculator calculating a first xy color coordinate at the first viewing angle using the first R, G, and B components and calculating a second xy color coordinate at the second viewing angle using the second R, G, and B components; and a panel controller compensating a target color coordinate of the display panel to include the first xy color coordinate and the second xy color coordinate into a specification area on a color coordinate system.

18 Claims, 3 Drawing Sheets

DISPLAY PANEL TEST APPARATUS AND METHOD THEREOF

CLAIM OF PRIORITY

This application makes reference to, incorporates the same herein, and claims all benefits accruing under 35 U.S.C. §119 from an application earlier filed in the Korean Intellectual Property Office on 9 Jul. 2012 and there duly assigned Serial No. 10-2012-0074640.

BACKGROUND OF THE INVENTION

1. Field of the Invention

The present invention generally relates to a display panel test apparatus and a method thereof.

2. Description of the Related Art

In general, a display panel of a liquid crystal display (LCD) or a display panel of an organic light emitting display (OLED) have differences in luminance or brightness between RGB pixels depending on an angle (i.e., viewing angle) of the display panel.

The above information disclosed in this Related Art section is only for enhancement of understanding of the background of the invention and therefore it may contain information that does not form the prior art that is already known in this country to a person of ordinary skill in the art.

SUMMARY OF THE INVENTION

The present invention provides for a display panel test apparatus that minimizes color variation of a display panel due to a viewing angle, and a method thereof.

A display panel test apparatus according to an exemplary embodiment of the present invention may include: a first measurer measuring first R, G, and B components of light emitted from a display panel at a first viewing angle; a second measurer measuring second R, G, and B components of light emitted from the display panel at a second viewing angle; a color coordinate calculator calculating a first xy color coordinate at the first viewing angle using the first R, G, and B components and calculating a second xy color coordinate at the second viewing angle using the second R, G, and B components; and a panel controller compensating a target color coordinate of the display panel to include the first xy color coordinate and the second xy color coordinate into a specification area on a color coordinate system, and a data signal supplied to the display panel is controlled according to the target color coordinate.

The first viewing angle may be the front of the display panel.

The first measurer and the second measurer may measure light emitted from the same measurement point of the display panel at different viewing angles, at the same distance.

The color coordinate calculator may compensate the first R, G, and B components into a first CIE tri-stri-stimulus function XYZ and may convert the first CIE tri-stri-stiumule function XYZ into the first xy color coordinate.

The color coordinate calculator may compensate the second R, G, and B components to a second CIE tri-stri-stimulus function XYZ and may convert the second CIE tri-stri-stimulus function XYZ into the second xy color coordinate.

When it is determined that at least one of the first xy color coordinate and the second xy color coordinate is not included in the specification area but reddish, the display controller may decrease the x of the target color coordinate or increase the y of the target color coordinate of the display panel.

The panel controller may compensate the target color coordinate within a range that the first xy color coordinate is not off from a greenish line on the color coordinate system.

When it is determined that at least one of the first xy color coordinate and the second xy color coordinate is not included in the specification area greenish, the display controller may decrease the y of the target color coordinate or increase the x of the target color coordinate of the display panel.

The panel controller may compensate the target color coordinate of the display panel within a range that the first xy color coordinate is not off from a reddish line on the color coordinate system.

Another exemplary embodiment of the present invention, a method is provided to test a display panel. The method may include: controlling the display panel to emit light of a white color; measuring first R, G, and B components of the light emitted from the display panel at a first viewing angle; measuring second R, G, and B components of the light emitted from the display panel at a second viewing angle; calculating a first xy color coordinate at the first viewing angle using the first R, G, and B components; calculating a second xy color coordinate at the second viewing angle using the second R, G, and B components; and compensating a target color coordinate of the display panel to include the first xy color coordinate and the second xy color coordinate in a specification area on a color coordinate system, and a data signal supplied to the display panel is controlled according to the target color coordinate.

The measuring the first R, G, and B components may include measuring R, G, and B components of light emitted from a measurement point of the display panel using a first measurer disposed on the front of the display panel.

The measuring the second R, G, and B components may include measuring R, G, and B components of light emitted from the measurement point of the display panel using a second measurer from a viewing angle that is different from the front of the display panel, and the first measurer and the second measurer are disposed at the same distance from the measurement point of the display panel.

The calculating the first xy color coordinate may include compensating the first R, G, and B components into a first CIE tri-stri-stimulus function XYZ and converting the first CIE tri-sari-stimulus function XYZ into the first xy color coordinate.

The calculating the second xy color coordinate may include compensating the second R, G, and B components to a second CIE tri-stri-stimulus function XYZ and converting the second CIE tri-stri-stimulus function XYZ into the second xy color coordinate.

The compensating the target color coordinate of the display panel may include decreasing the y of the target color coordinate or increasing the y of the target color coordinate when it is determined that at least one of the first xy color coordinate and the second xy color coordinate is not included in the specification range but reddish.

The decreasing the x of the target color coordinate or increasing the y of the target color coordinate may include compensating the target color coordinate of the display panel within a range that the first xy color coordinate is not off from a greenish line on the color coordinate system.

The compensating the target color coordinate of the display panel may include decreasing the y of the target color coordinate or increasing the x of the target color coordinate of the display panel when it is determined that at least one of the first xy color coordinate and the second xy color coordinate is not included in the specification area but greenish.

The decreasing the y of the target color coordinate or increasing the x of the target color coordinate of the display panel may include compensating the target color coordinate of the display panel within a range that the first xy color coordinate is not off from a reddish line on the color coordinate system.

Accordingly to the present invention, color variation of the display panel due to a viewing angle can be minimized by including the color variation due to the viewing angle into a specification based on the good quality product reference.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE EMBODIMENTS

Figure 1:
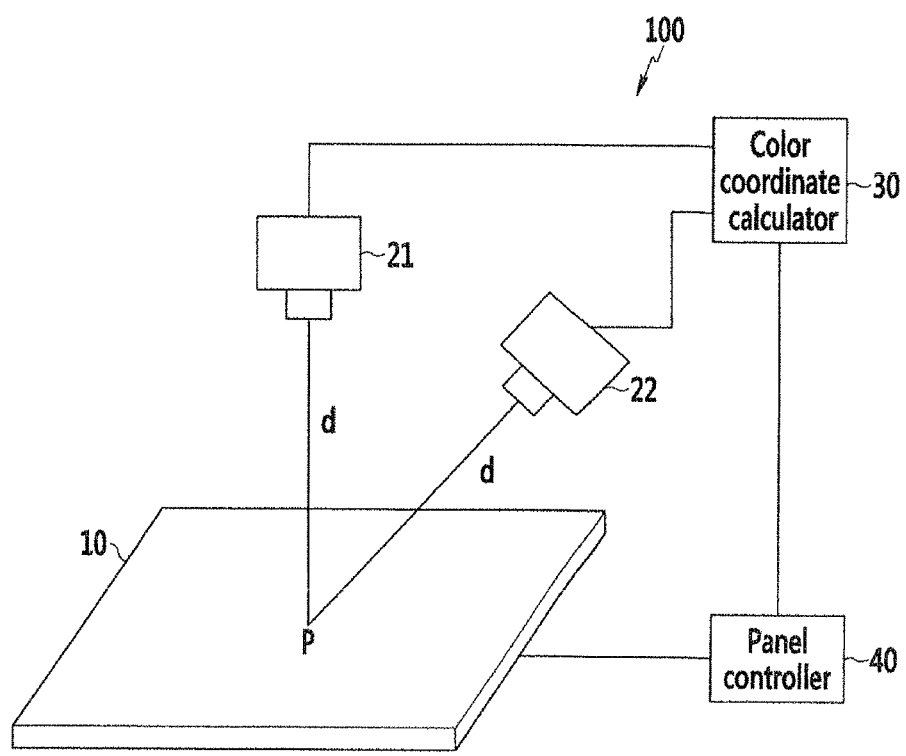
FIG. 1 is a block diagram of a display panel test apparatus according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In several embodiments, the same reference numerals are used for the elements having the same configuration to representatively explain the elements in a first embodiment, and only a different configuration from that of the first embodiment will be described in other embodiments.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In contrast, when an element is referred to as being "directly on," "directly connected to" or "directly coupled to" another element or layer, there are no intervening elements or layers present. In addition, unless explicitly described to the contrary, the word "comprise" and variations such as "comprises" or "comprising", will be understood to imply the inclusion of stated elements but not the exclusion of any other elements.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Often, when a user has a difficulty in viewing an image of the display panel a viewing angle other than the front of the display panel. For example, the screen displayed as a white color when being viewed from the front may be viewed reddish or greenish from a viewing angle of 60 degrees.

Such a viewing angle problem deteriorates video quality and causes inconvenience to the user because the user has to relocate the display panel to face the front of the user. The viewing angle problem can be solved by minimizing color variation of the display panel due to a viewing angle.

FIG. 1 is a block diagram of a display panel test apparatus according to an exemplary embodiment of the present invention.

Referring to FIG. 1, a display panel test apparatus 100 may include a first measurer 21, a second measurer 22, a color coordinate calculator 30, and a panel controller 40.

The first measurer 21 and the second measurer 22 measure a red color R, a green color G, and a blue color B of light emitted from the display panel 10 at the same distance d from a measurement point P of the display panel 10. In this case, the first measurer 21 faces toward the measurement point P in the front of the display panel 10, and the second measurer 21 faces toward the measurement point P at a viewing angle of a predetermined angle from the front of the display panel 10. The first measurer 21 and the second measurer 22 measure light emitted from the same measurement point P.

The first measurer 21 may be fixed to face the measurement point P in the front of the display panel 10, and the second measurer 22 may be movable to face the measurement point P at viewing angles of several angles.

The first measurer 21 may include a color filter for measurement of R, G, and B components in the light emitted from the display panel 10 and a infrared filter for absorption of light in an infrared area. The color filter may include a red filter that transmits only the R component, a green filter that transmits only the G component, and a blue filter that transmits only the B component. Light of the infrared area in the light emitted from the display panel 10 may be eliminated by the infrared filter. The light of which the infrared area light is eliminated passes through the red filter, the green filter, and the blue filter. The first measurer 21 converts light of the R, G, and B components to electric signals and transmits the electric signals to a color coordinate calculator.

The second measurer 22 may be formed the same as the first measurer 21, and measures R, G, and B components of light emitted from the display panel 10 at a viewing angle that is different from that of the first measurer 21. The second measurer 22 respectively converts light of the R component, light of the G component, and light of the B component into electric signals and transmits the electric signals to the color coordinate calculator. The electrical signals represent the R, G, and B components of light emitted from the display panel 10.

That is, the first measurer 21 transmits first R, G, and B components of light emitted from the display panel 10 at a first viewing angle to the color coordinate calculator 30, and the second measurer 22 transmits second R, G, and B components of light emitted from the display panel 10 at a second viewing angle to the color coordinate calculator 30.

The color coordinate calculator 30 calculates a first xy color coordinate at the first viewing angle using the first R, G, and B components transmitted from the first measurer 21, and calculates a second xy color coordinate at the second viewing angle using the second R, G, and B components transmitted from the second measurer 22.

A spectrum characteristic of the color filters included in the first and second measurers 21 and 22 should be the same as that the a CIE tri-stri-stimulus function, but the spectrum characteristic of the color filters is not substantially the same as the CIE tri-stri-stimulus function.

Thus, the color coordinate calculator 30 compensates the first R, G, and B components and the second R, G, and B components to the CIE tri-stri-stimulus function XYZ and then converts the CIE tri-stri-stimulus function XYZ to an xy color coordinate.

Equation 1 represents one example of an Equation for compensating the measured R, G, and B components to the CIE tri-stri-stimulus function.

$$\{R,G,B\}_s = \{R,G,B\}_c \cdot A$$

$$A = (\{R,G,B\}_c^T \cdot \{R,G,B\}_c)^{-1} \cdot (\{R,G,B\}_c^T \cdot \{R,G,B\}_s)$$ [Equation 1]

Here, $\{R,G,B\}s$ denotes measured R, G, and B components, $\{R,G,B\}c$ denotes a CIE tri-stri-stimulus function, and A denotes a 3×3 transformation matrix. By Equation 1, the first R, G, and B components measured by the first measurer 21 and the second R, G, and B components measured by the second measurer 22 are represented with CIE tri-stri-stimulus function XYZ.

The color coordinate calculator 30 converts the CIE tri-stimulus function XYZ into an xy color coordinate.

Equation 2 shows an example of an equation for converting the CIE tri-stimulus function xys into an xy color coordinate.

$$x = \frac{X}{X+Y+Z},$$ [Equation 2]

$$y = \frac{Y}{X+Y+Z}$$

Here, the xy color coordinate may be a value in a CIEXYZ 1931 colorimetric system.

Using Equation 1 and Equation 2, the color coordinate calculator 30 converts the first R, G, and B components of the first measurer 21 into a first xy color coordinate, and converts the second R, G, and B components of the second measurer 22 into a second xy color coordinate.

The panel controller 40 may include a specification that determines whether or not a color according to the viewing angle of the display panel 10 has good quality in the CIEXYZ 1931 colorimetric system. The specification area may be a range for allowing color variation according to a viewing angle of the display panel 10 when the display panel 10 emits light of a white color. The specification area can be determined according to an intension of a manufacturer.

The panel controller 40 determines whether the first xy color coordinate and the second xy color coordinate are included in the specification area. When the first xy color coordinate and the second xy color coordinate are included in the specification area, the display panel 10 has good quality with respect to the first viewing angle and the second viewing angle.

When at least one of the first xy color coordinate and the second xy color coordinate may be not included in the specification area, the panel controller 40 compensates a target color coordinate to control both of the first xy color coordinate and the second xy color coordinate are included in the specification area. The target color coordinate may be a color coordinate that becomes a reference for the display panel 10 to express a color with respect to input RGB data. A data signal supplied to the display panel 10 may be controlled according to the target color coordinate.

For example, when it is determined that one of the first xy color coordinate and the second xy color coordinate may be not included in the specification area and reddish, the panel controller 40 decreases x or decreases y in the target coordinate with a weight value that may include both of the first xy color coordinate and the second xy color coordinate into the specification area. When it is determined that one of the first xy color coordinate and the second xy color coordinate may be not included in the specification area and greenish, the panel controller 40 decreases y or decreases x in the target coordinate with a weight value that may include both of the first xy color coordinate and the second xy color coordinate into the specification area.

The display panel 10 processes the RGB data according to the target color coordinate that may be compensated according to the weight value determined by the panel controller 40 and displays the processed RGB data. That is, the display panel 10 controls a data signal supplied to the display panel according to a compensated target color coordinate.

In the above-stated description, xy color coordinates at two or more viewing angles are calculated to compensate the target color coordinate, but the display panel test apparatus 100 may measure R, G, B components of the display panel 10 at two or more viewing angles and include two or more xy color coordinates into the specification area for compensateion of the target color coordinate.

Figure 2:
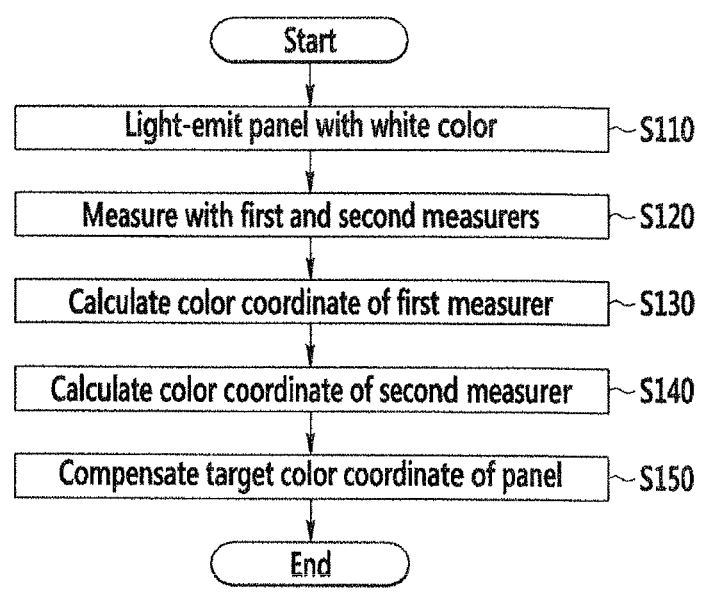
FIG. 2 is a flowchart of a display panel test method according to the exemplary embodiment of the present invention.

FIG. 2 is a flowchart of a method for testing the display panel according to the exemplary embodiment of the present invention.

Referring to FIG. 1 and FIG. 2, the display panel test apparatus 100 controls the display panel 10 to emit light of a white color (S110). In this case, the first measurer 21 may be set to face toward the measurement point P at a front (i.e. first viewing angle) of the display panel 10, and the second measurer 22 may be set to face toward the measurement point P at a second viewing angle that may be a predetermined angle from the front of the display panel 10. The measurement point P may be a center portion of the display panel 10 or may be a random portion.

The first measurer 21 and the second measurer 22 measure R, G, and B components of light emitted from the display panel 10 (S120). The first measurer 21 measures first R, G, and B components of light emitted from the display panel 10 at the first viewing angle, and the second measurer 22 measures second R, G, and B components of light emitted from the display panel 10 at the second viewing angle.

A first xy color coordinate on the CIEXYZ 1931 colorimetric system may be calculated from the first R, G, and B components measured by the first measurer 21 (S130). In this case, the first R.G.B components are compensated to first CIE tri-stimulus function XYZ, and the first CIE tri-stimulus function XYZ may be converted to the first xy color coordinate.

A second xy color coordinate on the CIEXYZ 1931 colorimetric system may be calculated from the second R, G, and B components measured by the second measurer 22 (S140). In this case, the second R, G, and B components are compensated to a second CIE tri-stimulus function XYZ and the second CIE tri-stimulus function XYZ may be converted to the second xy color coordinate.

The display panel test apparatus 100 determines whether the first xy color coordinate and the second xy color coordinate are included in the specification area on the CIEXYZ 1931 colorimetric system, and compensates the target color coordinate of the display panel 10 to include both of the first xy color coordinate and the second xy color coordinate in the specification area of one of the first xy color coordinate and the second xy color coordinate is not included in the specification area (S150). A method for compensating the target color coordinate of the display panel 10 will be described with reference to FIG. 3.

Figure 3:
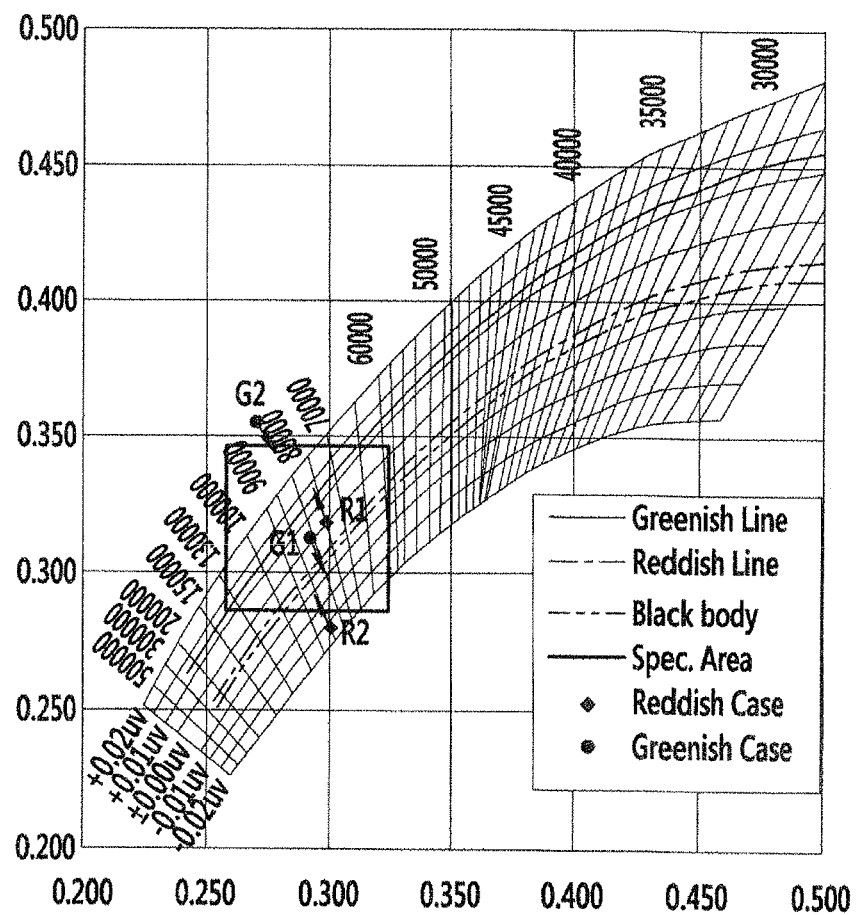
FIG. 3 is a graph for description of a method for compensating a target color coordinate of the display panel according to the exemplary embodiment of the present invention.

FIG. 3 is a graph for description of the method for compensating the target color coordinate of the display panel according to the exemplary embodiment of the present invention.

Referring to FIG. 3, a black body line, a greenish line, a reddish line, and a specification area on the CIEXYZ 1931 colorimetric system are illustrated. The black body line, the greenish line, and the reddish line depend on a Planck's curve.

When the display panel emitting light of a white color may be measured using the measurers 21 and 22, the display panel 10 that displays a white color may look greenish if the xy color coordinate is off from the greenish line, centering the black body line.

In addition, when the display panel 10 emitting light of a white color may be measured by the measurers 21 and 22, the display panel 10 displaying the white color may look reddish of the xy coordinate is off from the reddish line.

Assume that the xy color coordinate of light measured by the first measurer 21 at the first viewing angle in the front is G1 and the xy color coordinate of light measured by the second measurer 22 at the predetermined second viewing angle is G2. In this case, the display panel 10 is looked white when being viewed from the front but the display panel 10 is looked greenish when being viewed from the second viewing angle. Since the G2 is greenish and thus off from the specification area, the y is decreased and the x is increased in the target color coordinate to include the G2 into the specification area. In this case, the y of the target color coordinate is decreased and the y of the target color coordinate is increased within a range that the G1 is not off from the specification area. Further, it is prefer to decrease the y of the target color coordinate and increase the x of the target color coordinate within a range that the G1 is no off from the reddish line. Then, the degree that the display panel 10 may look greenish at the second viewing angle can be reduced while maintain the display panel 10 to be looked white from the front. The target color coordinate of the display panel 10 can be compensated to control the G1 and G2 move along an isotherm line of a Planck curved line.

Assume that the xy color coordinate of light measured by the first measurer 21 at the front viewing angle in the front is R1 and the xy color coordinate of light measured by the second measurer at the predetermined second viewing angle is R2. In this case, the display panel 10 is looked white from the front but the display panel 10 is looked reddish at the second viewing angle. That is, a reddish case. Since the R2 is reddish and thus off from the specification area, the x of the target color coordinate is decreased and the y of the target color coordinate is increased to include the R2 into the specification area. In this case, the x of the target color coordinate is decreased and the y of the target color coordinate is increased within a range that the R1 is not off from the specification area. Further, it is prefer to decrease the x of the target color coordinate and increase the y of the target color coordinate within a range that the R1 is no off from the greenish line. Then, the degree that the display panel 10 is looked reddish at the second viewing angle can be reduced while maintain the display panel 10 to be looked white from the front. The target color coordinate of the display panel 10 can be compensated to control the R1 and R2 move along the isotherm line of the Planck curved line.

When light of the display panel 10 is measured at three or more viewing angles and three of more xy color coordinates are calculated, the target color coordinate of the display panel 10 can be compensated to include the three or more xy color coordinates into the specification area.

With the above-described method, color variation of the display panel 10 due to a viewing angle can be minimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, it will be understood that those skilled in the art may perform various modifications and equivalent embodiments from the description. Accordingly, the technical scope of the present invention will be determined based on technical spirits of the claims.

What is claimed is:

1. A display panel test apparatus, comprising;
   a first measurer measuring first R, G, and B components of light emitted from a display panel at a first viewing angle;
   a second measurer measuring second R, G, and B components of light emitted from the display panel at a second viewing angle;

a color coordinate calculator calculating a first xy color coordinate at the first viewing angle using the first R, G, and B components and calculating a second xy color coordinate at the second viewing angle using the second R, G, and B components; and a panel controller compensating a target color coordinate of the display panel to include the first xy color coordinate and the second xy color coordinate into a specification area on a color coordinate system, wherein a data signal supplied to the display panel is controlled based on the target color coordinate.

2. The display panel test apparatus of claim 1, wherein the first viewing angle is the front of the display panel.

3. The display panel test apparatus of claim 1, wherein the first measurer and the second measurer measure light emitted from the same measurement point of the display panel at different viewing angles, at the same distance.

4. The display panel test apparatus of claim 1, wherein the color coordinate calculator compensates the first R, G, and B components into a first CIE tri-stimulus function XYZ and converts the first CIE tri-stimulus function XYZ into the first xy color coordinate.

5. The display panel test apparatus of claim 1, wherein the color coordinate calculator compensates the second R, G, and B components to a second CIE tri-stimulus function XYZ and converts the second CIE tri-stimulus function XYZ into the second xy color coordinate.

6. The display panel test apparatus of claim 1, wherein, when it is determined that at least one of the first xy color coordinate and the second xy color coordinate is not included in the specification area but reddish, the display controller decreases the x of the target color coordinate or increases the y of the target color coordinate of the display panel.

7. The display panel test apparatus of claim 6, wherein the panel controller compensates the target color coordinate within a range that the first xy color coordinate is not off from a greenish line on the color coordinate system.

8. The display panel test apparatus of claim 1, wherein when it is determined that at least one of the first xy color coordinate and the second xy color coordinate is not included in the specification area greenish, the display controller decreases the y of the target color coordinate or increases the x of the target color coordinate of the display panel.

9. The display panel test apparatus of claim 8, wherein the panel controller compensates the target color coordinate of the display panel within a range that the first xy color coordinate is not off from a reddish line on the color coordinate system.

10. A method for testing a display panel, comprising:
controlling the display panel to emit light of a white color;
measuring first R, G, and B components of the light emitted from the display panel at a first viewing angle;
measuring second R, G, and B components of the light emitted from the display panel at a second viewing angle;
calculating a first xy color coordinate at the first viewing angle using the first R, G, and B components;
calculating a second xy color coordinate at the second viewing angle using the second R, to G, and B components; and compensating a target color coordinate of the display panel to include the first xy color coordinate and the second xy color coordinate in a specification area on a color coordinate system, wherein a data signal supplied to the display panel is controlled based on the target color coordinate.

11. The method for testing the display panel of claim 10, wherein the measuring the first R, G, and B components comprises measuring R, G, and B components of light emitted from a measurement point of the display panel using a first measurer disposed on the front of the display panel.

12. The method for testing the display panel of claim 11, wherein the measuring the second R, G, and B components comprises measuring R, G, and B components of light emitted from the measurement point of the display panel using a second measurer from a viewing angle that is different from the front of the display panel, and the first measurer and the second measurer are disposed at the same distance from the measurement point of the display panel.

13. The method for testing the display panel of claim 10, wherein the calculating the first xy color coordinate comprises:
compensating the first R, G, and B components into a first CIE tri-stimulus function XYZ; and
converting the first CIE tri-stimulus function XYZ into the first xy color coordinate.

14. The method for testing the display panel of claim 10, wherein the calculating the second xy color coordinate comprises:
compensating the second R, G, and B components to a second CIE tri-stimulus function XYZ; and
converting the second CIE tri-stimulus function XYZ into the second xy color coordinate.

15. The method for testing the display panel of claim 10, wherein the compensating the target color coordinate of the display panel comprises decreasing the x of the target color coordinate or increasing the y of the target color coordinate when it is determined that at least one of the first xy color coordinate and the second xy color coordinate is not included in the specification range but reddish.

16. The method for testing the display panel of claim 15, wherein the decreasing the x of the target color coordinate or increasing the y of the target color coordinate comprises compensating the target color coordinate of the display panel within a range that the first xy color coordinate is not off from a greenish line on the color coordinate system.

17. The method for testing the display device of claim 10, wherein the compensating the target color coordinate of the display panel comprises decreasing the y of the target color coordinate or increasing the x of the target color coordinate of the display panel when it is determined that at least one of the first xy color coordinate and the second xy color coordinate is not included in the specification area but greenish.

18. The method for testing the display device of claim 17, wherein the decreasing the y of the target color coordinate or increasing the x of the target color coordinate of the display panel comprises compensating the target color coordinate of the display panel within a range that the first xy color coordinate is not off from a reddish line on the color coordinate system.

* * * * *